May 5, 1931. W. J. MILLER 1,804,059
APPARATUS FOR ELECTRIC WELDING
Filed July 6, 1928

Inventor
William J. Miller
By W. S. McDowell
Attorney

Patented May 5, 1931

1,804,059

UNITED STATES PATENT OFFICE

WILLIAM J. MILLER, OF COLUMBUS, OHIO, ASSIGNOR OF ONE-HALF TO WILLIAM E. RANNEY, OF COLUMBUS, OHIO

APPARATUS FOR ELECTRIC WELDING

Application filed July 6, 1928. Serial No. 290,765.

This invention relates to improvements in the art of electric welding, and has for its primary object the provision of a method and machine for facilitating the welding of galvanized sheet metal and to permit this operation to be carried out more effectively and expeditiously than has been heretofore accomplished.

In spot welding galvanized sheet metal a very considerable difficulty has been encountered in the matter of keeping the zinc flux from accumulating on the points of the spaced electrodes so as to permit said electrodes to be used for sustained periods of operation. Thus the zinc deposit builds up on the electrode points with the result that the latter rapidly lose their effectiveness and inefficient and poorly executed welding operations take place.

It is the outstanding feature of the present invention to provide means for preventing the zinc flux from interfering with the operation of the electrodes by a method which consists in forcing a fine stream of water, or other similar fluid, through the welding tool or electrode so that such stream of water, either in liquid or vapor form, will come into contact directly with the work being welded, whereby sufficient pressures or forces are developed which remove the zinc flux or other fluxes from the region of the electrode points and permit the latter to function effectively as long as they are in use.

Figure 1:
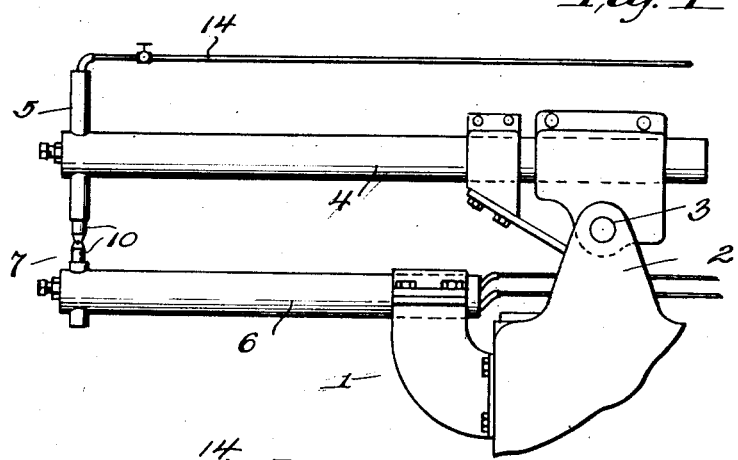
Figure 2:
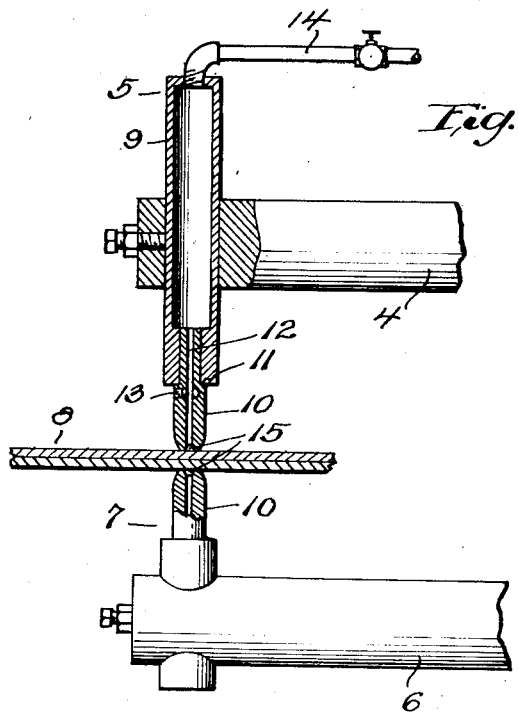
Figure 3:
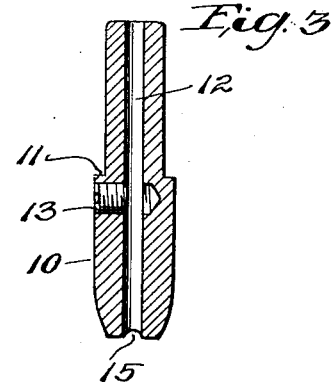

For a further understanding of the invention reference is to be had to the following description and the accompanying drawing wherein:

Figure 1 is a side elevation of a welding machine provided with electrodes formed in accordance with the present invention, Figure 2 is an enlarged vertical sectional view taken through the electrodes and disclosing the manner of circulating water or other fluids therethrough, Figure 3 is a vertical sectional view on an enlarged scale of one of the electrode points.

Referring more particularly to the drawing, the numeral 1 designates an ordinary electric welding machine. This machine comprises the usual frame 2 to which is pivoted as at 3 an oscillatory electrode carrying arm 4. The outer end of this arm being equipped with an electrode structure 5, the details of which will be hereinafter more fully explained. Below the arm 4 the frame 2 is provided with a parallel stationary arm 6, which also carries an electrode structure 7 at its outer end which is disposed in registration with the electrode structure 5. In operation the materials 8, ordinarily galvanized sheet metal, are placed between the electrodes 5 and 7 and the latter are brought together on opposite sides of the work, as indicated in Figure 2, electric current being passed, as usual, through the work and the electrodes for the purpose of fusing the localized area of the work and to unite the metal sheets.

To permit of sustained operation on galvanized sheets of this character the electrode structure 5 includes a hollow body 9, which is suitably held in the outer end of the movable arm 4. The lower part of this body is provided with a socket for the reception of an electrode point 10, which point is annularly shouldered as at 11 to engage with the lower surface of the body 9, and to limit the inserting movement of the upper portion of the point into the socket provided in the body 9. The point is formed with a longitudinally extending passage 12, the effective area of which may be regulated by adjustable screw 13. This passage establishes communication between the hollow interior of the body 9 and the exterior of the point 10 which rests upon the work 8. Water or other fluid may be introduced into the body 9 by way of the usual circulating pipes 14 which are commonly employed for the purpose of cooling the body 9. In applying water or other fluid to the body 9 for cooling purposes, it will be seen that in the present invention the passage 12 is provided in the point of the electrode so that a small stream of such fluid may pass through the electrode and into direct contact with the work. This results, it is believed, in the generation of steam which possesses sufficient pressure to force the welding zinc or flux from the surfaces of the point 10, so that the latter may directly engage with the work to provide an electrical and heat conducting contact. The steam is permitted to escape by transversely notching the lower portion of the point as indicated at 15 and this also provides for the quick removal of the zinc or flux from the region of electrode application.

The lower electrode structure 7 is of identical form and operation as the electrode structure 5 and therefore a detailed description of the same need not be repeated. The arm 6, however, is of hollow form to permit of direct water circulation to the electrode structure 7, whereas in the case of the upper electrode structure the water or fluid is supplied by way of the hose or pipe lines 14. In the event that the machine is not being used in connection with galvanized work, the set screws 13 may be adjusted so as to close the passages 12, thus permitting the electrode structures to function as is now customary, or if desired the points may be replaced by others wherein the small fluid conducting passages are omitted.

I have described what I consider to be the preferred embodiment of the invention and thus it will be understood that I do not limit myself to the exact features described but reserve the right to employ such variations or modifications thereof as may be said to fall fairly within the scope of the following claims.

What is claimed is:

1. In a welding machine, an electrode structure comprising a substantial hollow body having a socket in one end thereof, an electrode point having a reduced portion arranged within said socket, means for circulating fluid into said body, and a passage provided axially in said point and adapted to admit of fluid flow from said body to the work engaging end of said point.

2. An electrode structure for welding machines comprising a hollow body, a point carried by one end of said body, said point being provided with a longitudinally extending passage establishing communication between the hollow interior of said body and the work engaging surfaces of said point, and means for admitting of fluid flow into said body and through the passage provided in said point.

3. In a welding machine, an electrode structure comprising a hollow body, a work engaging point at one end of said body, said point being provided with a longitudinally extending passage, means for introducing fluid into said body to permit of the circulation of said fluid through the passage in said point, and means arranged in said point to regulate the effective area of said passage.

4. In a machine for welding galvanized sheet metal bodies, comprising a pair of spaced current carrying electrode points adapted to engage said metal bodies, each of said points being formed with a longitudinally extending passage of restricted size terminating at the outer ends of said points, and means for circulating liquid through said passages in each of said points and upon the surfaces of the metal undergoing treatment, whereby the liquid serves to remove the galvanized material from said metal bodies at the point of contact by said electrode points.

In testimony whereof I affix my signature.

WILLIAM J. MILLER.